United States Patent [19]
Megeed et al.

[11] Patent Number: 6,066,343
[45] Date of Patent: May 23, 2000

[54] METHODS AND COMPOSITIONS FOR MAKING FERMENTED CEREAL PRODUCTS

[75] Inventors: Mohamed Eid A. Megeed, Cairo, Egypt; David C. Sands, Bozeman, Mont.

[73] Assignee: Nutribiotech, LLC, Phoenix, Ariz.

[21] Appl. No.: 09/078,428

[22] Filed: May 13, 1998

[51] Int. Cl.⁷ .............................. A21D 2/24; A21D 10/02
[52] U.S. Cl. .............................. 426/20; 426/61; 426/549; 426/496
[58] Field of Search .................................. 426/18, 20, 21, 426/61, 549, 622, 496

[56] References Cited

U.S. PATENT DOCUMENTS 4,897,350  1/1990  El-Megeed et al. .................... 435/115
4,950,489  8/1990  Spiller ...................................... 426/18

*Primary Examiner*—Keith D. Hendricks
*Attorney, Agent, or Firm*—Klarquist Sparkman Campbell Leigh & Whinston, LLP

[57] ABSTRACT

The extent of fermentation of a food product by a microorganism can be controlled by using a selected quantity of a nutrient for which the microorganism is auxotrophic. For example, an improved sourdough bread product was produced using a bread dough made with a starter that included a *Lactobacillus fermentum* strain that is auxotrophic for methionine and a quantity of whey, a source of methionine, that was selected to stop fermentation when the bread dough reached a desired acidity level.

23 Claims, No Drawings

METHODS AND COMPOSITIONS FOR MAKING FERMENTED CEREAL PRODUCTS

TECHNICAL FIELD

This invention relates to compositions and methods for making fermented food products and beverages, in particular, compositions and methods for using auxotrophic bacteria for making bread.

BACKGROUND OF THE INVENTION

Many types of fermented foods and beverages, including, for example, fermented dairy or cereal products, wines, beers, and so on, form a major component of the human diet worldwide.

A major concern in commercial production of fermented foods and beverages is controlling the extent of the fermentation process. Commonly, fermentation is controlled by permitting fermentation to proceed for a predetermined period of time, then stopping fermentation by heating or chilling the food or beverage. It would be advantageous to have alternative methods to control fermentation. For example, in the preparation of fermented breads by conventional commercial practices, a large quantity of dough can be made at one time, but loaves made from the dough may be baked in several batches. Fermentation continues as the loaves await baking. As a result, the loaves can differ in acidity and other characteristics resulting from the fermentation process.

SUMMARY OF THE INVENTION

We have discovered that fermentation of food products or beverages can be controlled by using a microbe that is auxotrophic for a particular nutrient. A preselected quantity of the nutrient is added to a food product or beverage. Exhaustion of the nutrient causes fermentation to substantially cease when a particular acidity level or another desired characteristic is achieved, even though the temperature, availability of other nutrients, etc., would otherwise permit fermentation to proceed.

As one example, the acidity in a sourdough bread made using methionine-auxotrophic strains of *Lactobacillus fermentum* was controlled by adjusting the amount of whey (a source of methionine) in the bread dough. Fermentation by the Lactobacillus proceeded at a high rate until readily available methionine in the dough was exhausted, limiting acidity in the bread at a predetermined level. Moreover, since the *L. fermentum* strain used was a lysine-excreting strain, the resulting fermented bread had a high nutritional value.

Therefore, according to one embodiment of the invention, methods are provided for controlling fermentation of a food product or beverage, e.g., a bread dough, that includes a microorganism that is auxotrophic for a particular nutrient and a quantity of the nutrient. The food product is incubated under conditions suitable for fermentation by the microorganisms and for a time sufficient for substantial exhaustion of the nutrient, thereby producing a fermented food product. In one embodiment of the invention, auxotrophic Lactobacillus strains are employed.

According to another embodiment of the invention, methods for making fermented bread dough are provided. Such methods are particularly useful for making European style full-wheat and European country style rye/wheat bread. The bread dough includes a cereal flour (e.g., wheat or rye flour), water, a microorganism that is auxotrophic for a particular nutrient, and a quantity of the nutrient. The bread dough is fermented by incubating the dough under suitable conditions for a time sufficient for substantial exhaustion of the limiting nutrient. Microorganisms useful in such methods include, but are not limited to, one or more Lactobacillus strains, e.g., strains of *Lactobacillus fermentum*. Lysine-excreting strains of microorganisms, such as *Lactobacillus fermentum* strains M11, M14, NB-1, are preferred, since the excreted lysine improves the nutritional value of the bread dough. Such methods have been used for making European country-style full-wheat bread and European country-style rye/wheat bread, for example. In preferred embodiments, the nutrient is an amino acid, which can be provided, for example, by sources such as whey.

According to another embodiment of the invention, a sourdough bread such as European country-style wheat bread or European country-style rye/wheat bread is made using a fermented starter that includes an auxotrophic Lactobacillus strain. For example, according to one embodiment, the fermented starter is made from ingredients comprising, by weight, about 60 parts of rye flour, about 40 parts of wheat flour, about 57 parts water, about 2 parts of whey powder, and an inoculum of the Lactobacillus strain. According to another embodiment of the invention, a fermented European country-style wheat bread is made from bread dough that includes, by weight, about 100 parts wheat flour, about 66 parts water, about 2.4 parts sodium chloride, an amount of yeast equivalent to about 0.8 parts compressed yeast, and about 30 to 40 parts of a fermented starter comprising wheat flour, water, and the Lactobacillus strain. For optimal acidity and flavor, the bread dough is fermented at a temperature in the range of 26° C. to 30° C., inclusive. Preferably, a quantity of whey is selected such that the nutrient in the whey for which the Lactobacillus is auxotrophic is substantially exhausted when the pH of the bread dough is in the range of about pH 4.2 to about pH 4.0, inclusive.

The present invention also provides microorganisms that are particularly well suited to the production of bread by the foregoing methods. Thus, in one embodiment, the invention provides cultures of *Lactobacillus fermentum* strains M11, M14 and NB-1, which have been deposited with the American Type Culture Collection under accession numbers 39910, 39911 and 202041, respectively. In another embodiment, the invention provides a fermentation starter culture comprising at least one microorganism selected from the group consisting of M11, M14 and NB-1. Another aspect of the invention is bread made with such a fermentation starter culture.

The foregoing and other aspects of the invention will become more apparent from the following detailed description.

DETAILED DESCRIPTION OF THE PREFERRED EMBODIMENTS

The description of the invention that follows focuses on the production of European country-style full-wheat bread or European country-style rye/wheat bread using methionine auxotrophs of *L. fermentum*. However, the invention is not limited thereto. The extent of fermentation of other food products and beverages, for example, can be controlled by using auxotrophic strains of microorganisms commonly used to produce such food products and beverages. Such food products and beverages include, but are not limited to, fermented cereal products. (e.g., sourdough breads, animal feed), fermented milk products (e.g., yogurt, buttermilk, and kefir), beers, wines, etc. Auxotrophic microorganisms for the practice of the invention can include any microorganism used for fermentation of such food products or beverages, including, but not limited to, bacteria such as Lactobacillus, Acidophilus, Propionibacterium, Pediococcus, and Pichia, yeast such as *Saccharomyces cerevisiae, Saccharomyces exigus,* etc.

The methods of the present invention are useful for controlling fermentation, thereby producing products having a desired level of a characteristic produced by fermentation, e.g., acidity, carbon dioxide gas (thereby controlling the level to which bread dough rises or the carbonation in a beverage), alcohol content, flavor characteristics, etc. In particular, by such methods it is possible to produce such products having greater uniformity in one or more of such characteristics.

The use of limiting quantities of a nutrient for which a microorganism is auxotrophic, as described herein, is generally applicable to any well-known process involving microbial fermentation.

Sourdough Sponge for Production of European Country-Style Full-Wheat Bread

The following is an example of a basic formula for producing a sourdough sponge for use as a starter for European country-style full-wheat bread (by weight): 100 parts soft wheat flour of 72% extraction (22° C.); 57 parts water (22° C.); 2 parts trace elements-enriched whey powder (e.g., as available from Italiana Ingredienti, Parma, Italy); 1 part powder of barley malt extract; 0.03 parts freeze-dried culture of *Lactobacillus fermentum* Lex$^+$strain M11, M14, or NB-1 having a total viable bacterial count not less than $5 \times 10^9$ cells/g.

After mixing and incubating for 14–18 hours at 70% relative humidity (RH) and 28° C., the pH of the sponge drops from pH 5.8 to pH 4.05–4.09 with total acidity ranging from 9.7 to 9.9.

A total viable bacterial count of around $5 \times 10^9$ cells/g freeze-dried culture delivers about $10^6$ cells/g of sponge flour and provides maximum fermentation power during sponge development with regard to the level of sourness (lactic and acetic acids) that is acceptable to consumers. If the freeze-dried cells have a lower total viable bacterial count than $5 \times 10^9$ cells/g, the amount of the inoculum can be adjusted to deliver about $10^6$ cells/g sponge flour. Dose experiments showed that starter prepared with a higher bacterial count did not provide any additional efficiency for acid production during the development period at 28–30° C. However, higher or even lower doses of bacteria did not significantly change the flavor or performance of the starter.

To improve the performance of the Lactobacillus, a whey powder enriched in trace elements is preferred. Such an enriched whey can provide not only L-methionine, for which M11, M14, and NB-1 are auxotrophic, but also magnesium, manganese, and iron, for example, which stimulate enzymatic activity and activate microbial metabolism to produce both acetic(acid, lactic acid and carbon dioxide gas and to help development of the sponge.

The NB-1 strain of *Lactobacillus fermentum* is a selection of the *L. fermentum* strain M11 that was selected for maximum lysine production. NB-1 is a methionine auxotroph that requires 50 mg/L L-methionine for growth to about $10^{13}$ cells/L in liquid media.

By adjusting the amount of external methionine added during fermentation, a baker can attenuate the fermentation at the desired level of acidity, for example, producing a uniform baked product. Whey (e.g., added at about 1.1% to about 1.5% of flour, and preferably about 1.3% of flour, by weight, for European country-style full-wheat bread) is a good source of readily available amino acids, including L-methionine. However, other conventional sources of methionine can be used, e.g., sources of degraded or degradable proteins. The precise ratio of added methionine (e.g., whey) to flour depends on the source of methionine (including the weight percentage of free methionine in the methionine source), the availability-of methionine from other ingredients, and the desired properties of the baked product such as the acidity of the product, for example, and can be optimized empirically. For example, if greater acidity is desired, more methionine can be added to the bread dough to permit fermentation to proceed longer.

When methionine in the whey is substantially exhausted, the concentration of available methionine in the bread dough is sufficiently low (e.g., from wheat proteins, for example) that the growth of the Lactobacillus "substantially ceases." As a result, the acidity level of the bread dough is held within a relatively narrow range.

As used herein, the term "substantially ceases" indicates a decrease in the growth rate of an auxotrophic microorganism of at least 50%, more preferably at least 75%, and most preferably at least 90%. Correspondingly, "substantial exhaustion" of a particular nutrient for which a microorganism is auxotrophic indicates a reduction of the extracellular concentration of the nutrient in a form that is readily available to the microorganism (e.g., a free amino acid rather than a protein) to a level that causes the growth rate of the microorganism to "substantially cease." Preferably, the readily available or free concentration of the nutrient is reduced by at least 80%, more preferably by at least 90%, and most preferably by at least 95% from the concentration of the nutrient when fermentation begins.

In fermentations in which the availability of the limiting nutrient can be strictly controlled, the growth of the auxotrophic microorganism can be stopped completely by depletion of the limiting nutrient. However, in the case of bread dough supplemented with whey, even after the methionine in whey is substantially exhausted, methionine is available as a result of the breakdown of proteins in the bread dough, for example. Nonetheless, substantial exhaustion of methionine in the whey causes the effective concentration of free methionine in the bread dough to drop significantly, and thus the growth rate of the Lactobacillus and the concomitant rate of increase in dough acidity slows substantially. Use of the sourdough sponge results in greater standardization as a result of the ability to effectively control the acidity level at a desired level and also as a result of the use of the dominant, non-pathogenic, actively fermenting Lactobacillus (rather than a wild culture), resulting in a superior bread product, particularly as produced in a commercial automated facility.

One of skill in the art will recognize that bread recipes vary greatly and that many individual bakers regard their recipes as secret. However, any baker will be able to use the present invention in conjunction with his or her own recipe. To do this, a baker will employ an auxotrophic microorganism to ferment the dough (e.g., the NB-1 strain described herein). Then, test batches of dough will be fermented using the baker's recipe but with varying quantities of the metabolite for which the microorganism is an auxotroph (e.g., where the limiting metabolite is methionine and the primary source of methionine is whey, the amount of whey would be varied). The amount of the metabolite that results in substantial cessation of fermentation at the appropriate time, i.e., after the appropriate amount of fermentation required prior to baking for that particular recipe, will then be selected for future use. By way of example, where the limiting metabolite is methionine provided in whey and the NB-1 strain is used, whey content of about 0.45–1.8% (w/w) of the starter flour content should provide appropriate control of fermentation in many bread recipes.

It is preferable not to recycle the sponge to prevent spoilage or decreasing the sponge strength.

For proofing the sponge for making European country-style full-wheat bread, incubation temperatures higher than 30° C. maximize production of acetic acid (a flavor enhancer) while incubation temperatures lower than 26–27° C. generate more lactic acid (sourness).

TABLE 1

Trace Element Composition of Regular Whey and Enriched Whey

| Element | Enriched Whey | Regular Whey |
| --- | --- | --- |
| Mg (%) | 0.19 | 0.09 |
| Mn (%) | 0.26 | 0.14 |
| N (%) | 4.10 | 1.73 |
| P (%) | 1.38 | 0.61 |
| B (mg/kg) | 5.10 | 4.85 |
| Ca (%) | 0.90 | 0.42 |
| K (%) | 4.7 | 2.3 |
| Na (%) | 1.26 | 0.62 |
| Cu (mg/kg) | 0.51 | 0.33 |
| Fe (mg/kg) | 3.54 | 2.25 |
| Zn (mg/kg) | 2.21 | 1.30 |

Commercial Batch-Fermentation Douah for European Country-Style Full-Wheat Bread

The following basic formula was used to produce a commercial batch-fermentation dough for European country-style full-wheat bread (by weight): 100 parts soft wheat flour of 72% extraction (22° C.); 66 parts water (22–24° C.); 2.4 parts table salt (sodium chloride); 0.8 parts compressed yeast; and 30–40 parts developed sponge. After the ingredients are mixed, the first proofing takes place for 90 min at 27° C. and 60% relative humidity. By the end of the first proofing, the dough temperature reaches about 30° C. The pH of the dough drops from pH 5.6–5.8 to pH 4.68–4.87 and the total acidity increases from 2.5 to 4.45–7.27.

After cutting and panning the dough, the second proofing takes place for 90 min at 27° C. and 80 relative humidity in a proofing cabinet. Under such conditions the pH of the dough decreases to 4.05–4.30 and the total acidity increases to 6.35–7.23.

The European country-style full-wheat bread loses acidity after baking for one hour, having a pH of 4.45 to 4.58 and a total acidity in the range of 5.4 to 5.6. By contrast, a standard European country-style full-wheat bread (fermented without the above-described sourdough sponge) had a pH of 5.65 and a total acidity of 2.9 after baking for one hour.

Commercial Batch-Fermentation Douah for European Country-Style Rye/Wheat Bread

For making European country-style rye/wheat bread, the flour used is approximately 50–70% rye flour and 50–30% wheat flour. A high-quality whey constitutes about 0.45% to about 1.8% of the starter flour content. The starter represented about 15–30% of the added flour content of the bread dough, depending on the desired level of acidity in the final product. It is recommended (although not essential) that the starter include some of each type of flour included in the end product (i.e., both rye and wheat flour in the case of European country-style rye/wheat bread).

Rye flour has a higher trace element content than wheat flour. Therefore, starters with 60% rye flour require less whey than 100% wheat flour starters, for example.

Lysine-excreting Lactobacillus strains.

Preferred *Lactobacillus fermentum* strains for the practice of the invention are lysine-excreting strains, including, but not limited to, Lex+ strain M11, M14, or NB-1, and combinations thereof.

Normal cereal grains, including wheat, are low in some of the essential amino acids, e.g., lysine, threonine, methionine, tryptophan, and isoleucine. The nutritive value of fermented breads can be improved by increasing the content of these so-called "limiting" amino acids in cereal protein. "High quality" protein includes all of the limiting amino acids in optimum proportions.

Egg protein is considered to have close to an ideal proportion of amino acids, with a nutritional value of 93 on a 100 point scale. The Food and Agriculture Organization recommends a minimum lysine ratio of 5.2% in protein as an ideal proportion for infants. Wheat protein generally has about one-half of this recommended level. The protein value of wheat flour can be increased from 35 to 55 by supplementation with 0.10% of lysine. Another test of protein quality is the Protein Efficiency Ratio (PER), which represents the ratio of the amount of weight gained to the amount of protein consumed. Wheat normally has a PER of 0.93, but wheat supplemented with 0.10% lysine has a PER of 1.45.

Various microorganisms and their mutant strains have been used to produce lysine, e.g., strains of *E. coli* (U.S. Pat. No. 2,841,532), *Micrococcus glutamicus* (U.S. Pat. No. 2,979,439 and 3,524,797), *Brevibacterium lactofermentum* (U.S. Pat. No. 3,527,672), *Brevibacterium glutamicus* (U.S. Pat. No. 3,756,916), Pseudomonas or Achromobacter (U.S. Pat. No. 3,905,866), and Corynebacterium or Brevibacterium (U.S. Pat. No. 4,275,157 and 4,411,997). U.S. Patent No. 4,897,350 (the disclosure of which is incorporated herein by reference) discusses the selection and use of lysine-excreting *Lactobacillus fermentum* Lex+ strains M11, M14, and NB-1 for production of Baladi bread, a fermented bread.

*L. fermentum* has the following characteristics: Gram-positive rod, non-motile, catalase negative, produces acid and gas from glucose and gluconate, ferments arabinose, galactose, lactose, mannose, and xylose but not cellobiose and trehalose, grows at 45° C. but not at 15° C. (Bergey's Manual, 1974). Selection of lysine-excreting strains of *L. fermentum* is described in U.S. Pat. No. 4,897,350. Briefly stated, bacteria were exposed to sequentially higher levels of the following amino acid analogs, first singly and then in combination: 5-S-amino ethyl cysteine, γ-hydroxyllysine, lysine hydroxymate, and cyclohexylamine. The resulting mutants synthesize aspartokinase that is insensitive to multivalent feedback inhibition by lysine or threonine to increase the production of lysine from aspartate. Further selections are also carried out to obtain mutants having a homoserine dehydrogenase that is insensitive to feedback inhibition by threonine and repression by methionine, thereby maximizing the flow from aspartate to lysine. Such mutants include, but are not limited to, Met−, Thr−, Ile−, Lex+, and Eth$^R$. Measurement of amino acid excreted by the mutants can be performed by a cross-feeding method and thin-layer chromatography with modified mobile phase (n-propanol, 58 parts; NH$_4$OH, 27 parts; and H$_2$O, 15 parts).

The ability of a mutant to excrete lysine can be determined by standard methods. For example, as described in U.S. Pat. No. 4,897,350, cells of a strain can inoculated into a 30% w/v wheat flour/water extract and, after overnight incubation, the highest lysine excreters can be identified by a lysine bioassay using *Leuconostoc mesenteroides* (*Pediococcus cerevisiae*) (ATCC 8043), a lysine-requiring bacteria.

*L. fermentum* can be freeze dried by any standard method. See U.S. Pat. No. 4,897,350. Freeze-dried *L. fermentum* grow well on MRS broth at 37° C., but can be grown on any medium conventionally used for growing *L. fermentum*.

*L. fermentum* Lex$^+$ strain M11, M14, and NB-1 have been deposited with the American Type Culture Collection, 12301 Park Lawn Drive, Rockville, Md. 20852, under accession numbers ATCC 39910, 39911, and 202041, respectively.

The invention will be better understood by reference to the following Examples, which are intended to merely illustrate the best mode now known for practicing the invention. The scope of the invention is not to be considered limited thereto.

Examples

Example 1

Preparation of Sponge for European Country-Style Full-Wheat Bread

A sponge for European country-style full-wheat bread was prepared on a commercial scale using the ingredients shown in Table 2:

TABLE 2

Ingredients of Sponge for European Country-Style Full-Wheat Bread

| Ingredients | Grams | Proportion |
| --- | --- | --- |
| Soft wheat flour (72% extraction, 22° C.) | 6100 | 100 |
| Water (22° C.) | 3500 | 57 |
| Trace element-enriched whey | 110 | 1.8 |
| Powdered barley malt extract | 60 | 1 |
| Freeze-dried *Lactobacillus fermentum* (ATCC 39910 and 39911) | 2 | 0.03 |

The sponge ingredients were mixed for 10 min, then incubated at 28° C. at 70% relative humidity for 18 hours. At the end of 16–18 hours, the pH of the sponge dropped to 3.8–4.0 and the total acidity reached 9.0–13.3. Malt extract provided enzymes that help convert complex carbohydrates to simpler fermentable carbohydrates. Trace element-enriched whey provided nutrients necessary to compensate for the higher extraction of the wheat flour used to prepare the bread and to provide essential nutrients to improve the growth, performance, and the acidity production of the auxotrophic Lactobacillus.

Example 2

Production of European Country-Style Full-Wheat Bread Using the Sponge

European country-style full-wheat bread dough was prepared with the ingredients shown in Table 3:

TABLE 3

Ingredients for European Country-Style Full-Wheat Bread Dough

| Ingredients | Grams | Proportion |
| --- | --- | --- |
| Soft wheat flour (72% extraction, 22° C.) | 9800 | 100 |
| Water (22° C.) | 6500 | 66 |
| Table salt | 240 | 2.44 |
| Compressed yeast | 80 | 0.81 |
| Sponge of *Lactobacillus fermentum* (ATCC 39910) (pH 3.8, total acidity of 13.3) | 3440 | 34.8 |
| Powdered barley malt extract (optional) | 98 | 1 |

The bread ingredients were mixed for 10 min, then the first proofing took place for 90 min at 27° C. and 56% relative humidity. At the end of the first proofing the temperature of the dough had reached 31° C. and the pH dropped to 4.5 with a total acidity of 6.2. The fermented dough was then divided and panned at 1300 g/loaf. The second proofing took place at 28° C. and 80% relative humidity in the proofing cabinet. At the end of the second proofing, the pH of the bread had dropped to 4.1 and the total acidity reached 7.3. The dough was baked for 60 min. After baking, the bread pH was 4.4 and the total acidity was 5.6.

An "improved" European country-style full-wheat bread made as described above was compared with a standard European country-style full-wheat bread by two testing panels. The two testing panels were set up by a consumer market testing firm, the first including 50 persons and the second including 52 persons. As shown in Table 4, the panels distinguished the improved bread from the standard bread by its more intense flavor, crunchy crust, and natural, soft texture with small, consistent holes. 65% of the panel preferred the improved bread. The overall acceptance of the improved European bread was similar to that of homemade bread.

TABLE 4

Consumer Test of Improved and Standard European Country-Style Full-Wheat Bread

| | Standard Bread | Improved Bread |
| --- | --- | --- |
| Overall Preference | 35% | 65% |
| Intensity of Flavor (On a scale of 1–5) | 2.5 | 3.5 |
| Texture (On a scale of 1–5) | 3.5 | 3.0 |

Having illustrated and described the principles of the present invention, it should be apparent to persons skilled in the art that the invention can be modified in arrangement and detail without departing from such principles. We claim all modifications that are within the spirit and scope of the appended claims.

Example 3

Preparation of European Country-Style Rye/Wheat Sponge

A European country-style rye/wheat sponge was prepared using the sponge ingredients shown in Table 5:

TABLE 5

Ingredients of Sponge for European Country-Style Rye/Wheat Bread

| Ingredients | Gram | Portion |
| --- | --- | --- |
| Soft wheat flour | 1000 | 100 |
| Rye flour | 1500 | 150 |
| Water (60% of Wheat flour) | 600 | 60 |
| Water (80% of rye flour) | 800 | 80 |
| Whey (Normal) | 112 | 11.2 (of the total dry weight) |
| Malt Extract | 25 | 2.50 (of the total dry weight) |
| Multivitamins & Trace elements | 2.6 | 0.26 (of the total dry weight) |
| Freeze-dried NB-1 | .75 | 0.075 (of the total dry weight) |

The sponge ingredients were mixed for 7 minutes at low speed and 2 minutes at high speed then incubated for 16 hours at 28° C. and 75% relative humidity. At the end of the incubation period the matured sponge was tested for acidity (content and profile). The acid profile of the matured sponge was 76:24 lactic:acetic and the pH reached 4.

Example 4

Production of European Country-Style Rye/Wheat Bread

European country-style rye/wheat bread was prepared with the ingredients shown in Table 6.

TABLE 6

Ingredients for European Country-Style Rye/Wheat Bread

| Ingredients | Grams | Proportion |
| --- | --- | --- |
| Wheat Flour | 1000 | 100 |
| Rye Flour | 1500 | 150 |
| Water (60% of wheat) | 600 | 60 |
| Water (80% of rye) | 1200 | 120 |
| Salt | 45 | 4.5 (of the total dry weight) |
| Yeast | 50 | 5.0 (of the total dry weight) |
| Matured NB-1 Starter | 825 | 82.5 (of the total dry weight) |

The ingredients were mixed for 7 minutes at low speed and then 2 minutes at high speed followed by resting for 15 minutes at room temperature and then a second resting (proofing) for 60 minutes at 30° C. and 75% relative humidity. The dough was then baked at 270–210° C. for 52 minutes. The total acidity and pH of bread-dough after fermentation, and bread after baking were recorded as follows in Table 7.

TABLE 7

Total Acidity and pH

| Stage of Dough Maturity | PH | Total Acidity |
| --- | --- | --- |
| Bread Dough | 5.07 | 5.41 |
| Dough after fermentation | 4.92 | 6.36 |
| Bread | 4.87 | 7.22 |

What is claimed is:

1. A method for controlling fermentation of dough for a fermented cereal product comprising:

providing a dough comprising a Lactobacillus microorganism that is auxotrophic for an amino acid and a quantity of the amino acid; and incubating the dough under conditions suitable for fermentation of the dough by the Lactobacillus microorganisms for a time sufficient for the quantity of the amino acid to become substantially exhausted, thereby producing a fermented dough.

2. A method for making a fermented bread dough comprising:

providing a bread dough comprising a cereal flour, water, a Lactobacillus microorganism that is auxotrophic for an amino acid, and a quantity of the amino acid; and incubating the bread dough under conditions suitable for fermentation of the bread dough by the Lactobacillus microorganism for a time sufficient for the quantity of the amino acid to become substantially exhausted, thereby producing a fermented bread dough.

3. The method of claim 2 wherein the microorganism is at least one strain of *Lactobacillus fermentum*.

4. The method of claim 3 wherein the microorganism is at least one strain selected from the group consisting of *Lactobacillus fermentum* strains M11, M14 and NB-1.

5. The method of claim 4 wherein the microorganism is *Lactobacillus fermentum* strain NB-1.

6. The method of claim 2 wherein the microorganism is a lysine-excreting microorganism.

7. A method of making a European country-style full-wheat or rye/wheat bread dough comprising:

providing a bread dough comprising wheat flour, water, yeast, a Lactobacillus fermented starter that is auxotrophic for an amino acid, and a quantity of the amino acid; and incubating the bread dough under conditions suitable for fermentation of the bread dough by the Lactobacillus strain for a time sufficient for the quantity of the amino acid to become substantially exhausted, thereby producing a European country-style full-wheat bread dough.

8. The method of claim 7 wherein the Lactobacillus fermented starter is fermented with a *Lactobacillus fermentum* strain.

9. The method of claim 8 wherein the *Lactobacillus fermentum* strain is selected from the group consisting of M11, M14, and NB-1, and mixtures thereof.

10. The method of claim 9 wherein the Lactobacillus fermentation strain is *Lactobacillus fermentum* strain NB-1.

11. The method of claim 7 wherein the Lactobacillus fermented starter is fermented with a lysine-excreting strain of Lactobacillus.

12. The method of claim 7 wherein the source of the amino acid is whey.

13. The method of claim 7 wherein the fermented starter is made from ingredients comprising, by weight, about 100 parts of wheat flour, about 57 parts water, about 2 parts of whey powder, and a Lactobacillus strain.

14. The method of claim 13 wherein the Lactobacillus strain is *Lactobacillus fermentum* strain NB-1.

15. The method of claim 7 wherein the fermented starter is made from ingredients comprising, by weight, about 60 parts of rye flour, about 40 parts of wheat flour, about 72 parts water, about 2 parts of whey powder, and the Lactobacillus strain.

16. The method of claim 15 wherein the Lactobacillus strain is *Lactobacillus fermentum* strain NB-1.

17. The method of claim 7 wherein the fermented starter is made from ingredients comprising, by weight, about 150 parts rye flour, about 100 parts wheat flour, about 180 parts water, and, as a proportion of total dry weight about 11.2 parts whey powder, about 2.5 parts malt extract and the Lactobacillus strain.

18. The method of claim 17 wherein the Lactobacillus strain is *Lactobacillus fermentum* strain NB-1.

19. The method of claim 7 wherein the bread dough comprises, by weight, about 100 parts wheat flour, about 66 parts water, about 2.4 parts sodium chloride, an amount of yeast equivalent to about 0.8 parts compressed yeast, and about 30 to 40 parts of a fermented starter comprising wheat flour, water, and the Lactobacillus strain.

20. The method of claim 7 comprising incubating the bread dough at a temperature in the range of 26° C. to 30° C. inclusive.

21. The method of claim 7 wherein the quantity of the source of the nutrient is selected such that fermentation of the bread dough substantially ceases when the pH of the bread dough is in the range of about 4.2 to about 4.0, inclusive.

22. A microorganism, *Lactobacillus fermentum* NB-1 (ATCC 202041).

23. A fermentation starter culture comprising a microorganism according to claim 22.

* * * * *

UNITED STATES PATENT AND TRADEMARK OFFICE
CERTIFICATE OF CORRECTION

PATENT NO. : 6,066,343
DATED : May 23, 2000
INVENTOR(S) : Mohamed Eid A. Megeed, David C. Sands It is certified that error appears in the above-identified patent and that said Letters Patent is hereby corrected as shown below:

Column 3,
Line 43, "5x109 cells/g," should read -- $5 \times 10^9$ cells/g --.
Line 56, "acetic(acid" should read -- acetic acid --.

Column 4,
Line 8, "availability-of" should read -- availability of --.

Column 5,
Lines 30 and 56, "Douah" should read -- Dough --.

Column 9,
Line 61, after the complete "Table 7" and before the claims start, insert -- After 24 hours the bread was further tested for both pH and total acidity. --.

Signed and Sealed this

Thirteenth Day of November, 2001

Attest:

NICHOLAS P. GODICI
Attesting Officer    Acting Director of the United States Patent and Trademark Office